United States Patent
Flynn et al.

(10) Patent No.: US 12,346,434 B2
(45) Date of Patent: Jul. 1, 2025

(54) SNAPSET RESTRICTED UTILIZATION AND PRESERVATION

(71) Applicant: Dell Products, L.P., Hopkinton, MA (US)

(72) Inventors: Melissa Flynn, North Attleboro, MA (US); Evan Jones, Glenville, NY (US)

(73) Assignee: Dell Products, L.P., Hopkinton, MA (US)

( * ) Notice: Subject to any disclaimer, the term of this patent is extended or adjusted under 35 U.S.C. 154(b) by 255 days.

(21) Appl. No.: 17/985,824

(22) Filed: Nov. 12, 2022

(65) Prior Publication Data

US 2024/0160728 A1    May 16, 2024

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .......................... G06F 21/554; G06F 2221/034
See application file for complete search history.

(56) References Cited

U.S. PATENT DOCUMENTS

| | | | | | |
|---|---|---|---|---|---|
| 5,551,028 | A | * | 8/1996 | Voll | G06F 30/00 |
| 5,566,329 | A | * | 10/1996 | Gainer | G06F 16/284 |
| 6,088,694 | A | * | 7/2000 | Burns | G06F 16/148 |
| | | | | | 707/999.009 |
| 7,882,074 | B2 | * | 2/2011 | Lee | H04N 5/76 |
| | | | | | 725/39 |
| 11,615,185 | B2 | * | 3/2023 | Lee | G06F 21/6218 |
| | | | | | 726/23 |
| 2005/0076237 | A1 | * | 4/2005 | Cohen | G06F 21/554 |
| | | | | | 726/4 |
| 2016/0342802 | A1 | * | 11/2016 | Xuan | G06F 21/54 |
| 2019/0013949 | A1 | * | 1/2019 | Strong | H04L 9/0891 |
| 2019/0108340 | A1 | * | 4/2019 | Bedhapudi | G06F 21/554 |
| 2019/0354443 | A1 | * | 11/2019 | Haustein | G06F 11/1451 |
| 2021/0224379 | A1 | * | 7/2021 | Pientka | G06F 11/1464 |
| 2021/0303687 | A1 | * | 9/2021 | Pendlebury | G06F 21/6218 |
| 2023/0131333 | A1 | * | 4/2023 | McColgan | H04L 9/30 |
| | | | | | 726/16 |
| 2023/0147026 | A1 | * | 5/2023 | Munshani | G06F 11/1435 |
| | | | | | 714/15 |
| 2023/0177158 | A1 | * | 6/2023 | Gee | G06F 21/568 |
| | | | | | 726/22 |
| 2024/0037212 | A1 | * | 2/2024 | Rajendran | G06F 21/604 |

* cited by examiner

*Primary Examiner* — Carl G Colin
*Assistant Examiner* — Zhe Liu
(74) *Attorney, Agent, or Firm* — Anderson Gorecki LLP (57) ABSTRACT

Attributes of snapshots are provided that ensure snapshot preservation and enable utilization of snapshots to be restricted. If a cyber intrusion event is detected, fence attributes are set on snapshots that were created after the time of the possible cyber intrusion event to restrict those snapshots from being used for cyber recovery until after the data contained in the snapshots has been validated. If a snapshot is selected for use, the fence attribute is checked and, if set, prevents the snapshot from being used until the data of the snapshot is validated. Additionally, keep attributes are set on snapshots that were created before the possible cyber intrusion event, to preserve those snapshots to prevent the snapshots from termination. If a snapshot is selected for termination, the keep attribute is checked, and if set, prevents the snapshot from being terminated until the keep attribute is reset.

20 Claims, 7 Drawing Sheets

SNAPSET RESTRICTED UTILIZATION AND PRESERVATION

FIELD

This disclosure relates to computing systems and related devices and methods, and, more particularly, to a method and apparatus for restricting snapset utilization and ensuring snapset preservation.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method and apparatus for restricting snapset utilization and ensuring snapset preservation is provided using snapset attributes. In some embodiments snapshots are provided with keep attributes that are used to ensure snapset preservation, and fence attributes that are used to restrict snapshot utilization. If a cyber intrusion event is detected, fence attributes are set on snapshots that were created after the time of the possible cyber intrusion event to restrict those snapshots from being used for cyber recovery until after the data contained in the snapshots has been validated. Additionally, keep attributes are set on snapshots that were created before the possible cyber intrusion event, to preserve those snapshots to prevent the snapshots from termination. In some embodiments, multiple security levels are implemented specifying different levels of authorization required to remove a keep attribute to enable a snapshot to be terminated.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
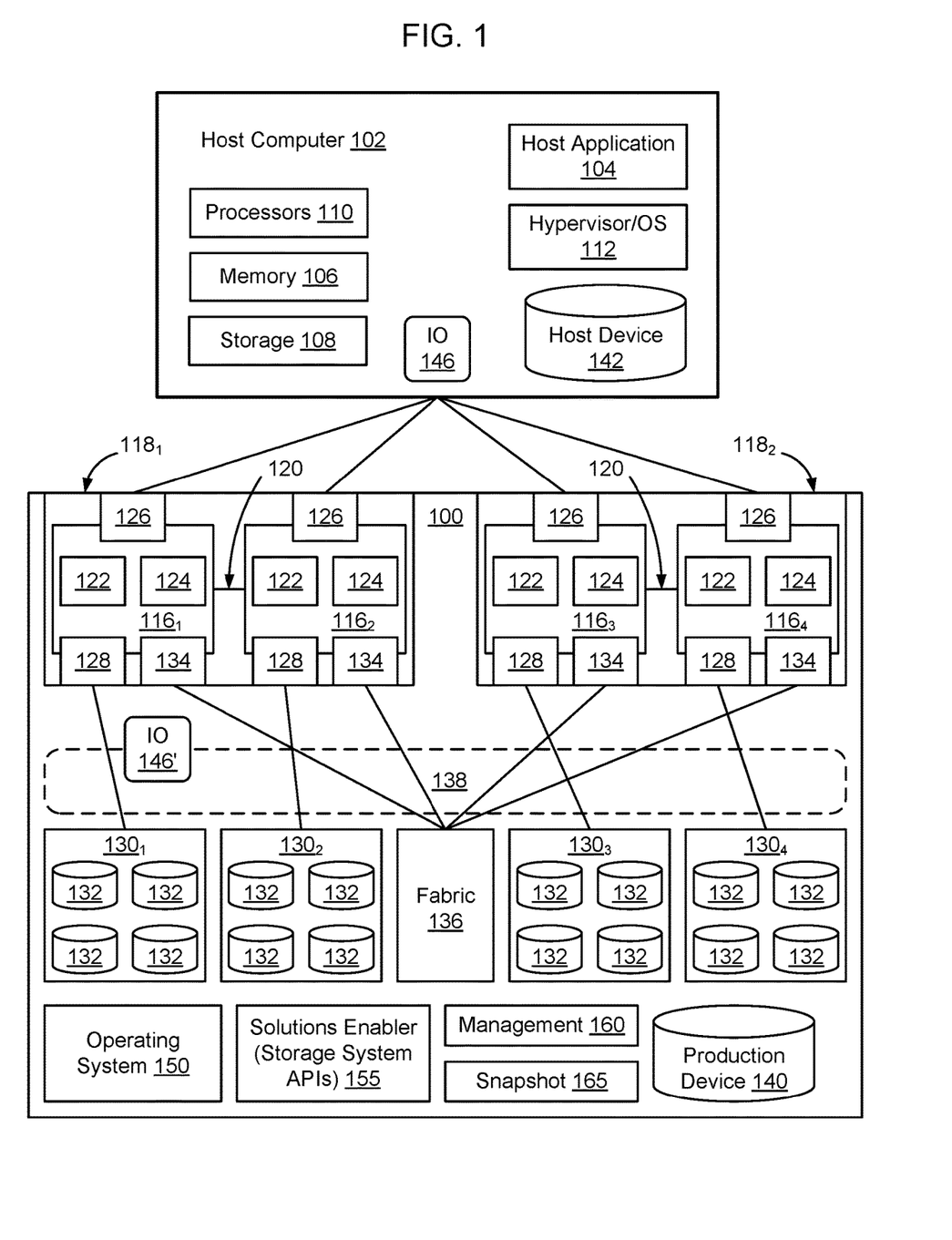
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes 116₁-116₄, possibly including but not limited to storage servers and specially designed compute engines or storage directors for providing data storage services. In some embodiments, pairs of the compute nodes, e.g. (116₁-116₂) and (116₃-116₄), are organized as storage engines 1181 and 1182, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines 1181 and 1182, which has a pair of (two independent) compute nodes, e.g. (116₁-116₂) or (116₃-116₄). A given storage engine 118 is implemented using a single physical enclosure and provides a logical separation between itself and other storage engines 118 of the storage system 100. A given storage system 100 may include one storage engine 118 or multiple storage engines 118.

Each compute node, 116₁, 116₂, 116₃, 116₄, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node 116₁-116₄ may also include one or more back-end adapters 128 for communicating with respective associated back-end drive arrays 130₁-130₄, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes 116₁-116₄, using a PCIe (Peripheral Component Interconnect Express) bus or may be connected to the compute nodes 116₁-116₄, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes 116₁-116₄ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes 116₁-116₄. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

As is clear from the description of FIG. 1, storage systems such as the storage system 100 are complex systems that involve multiple hardware components and multiple software applications that execute on the storage system to provide access to the storage resources of the storage system 100 and to protect data maintained by the storage system 100. In some embodiments, a set of Application Programming Interfaces (APIs) 155 are used to enable a management system 160 to interact with the storage system and configure the underlying storage system. An example software application that has been developed that provides a set of APIs to interface with storage systems from Dell™ is referred to herein as Solutions Enabler. An example storage system management application that has been developed to interact with storage systems from Dell™ is referred to herein as Unisphere. Although some embodiments will be described in which both Solutions Enabler and Unisphere are described as being included as supporting software to be included in several example development environments, it should be understood that other supporting software applications such as collections of APIs and storage system management applications may similarly be used. By making system calls to the APIs exposed by the operating system of the storage system, it is possible to take operations on the storage system.

In some embodiments, the storage system 100 includes a snapshot subsystem 165 configured to create point in time copies of storage volumes. As used herein, the term snapshot will be used to refer to a point in time copy of a storage volume as the data of the storage volume existed at a particular point in time. Some applications use multiple storage volumes. To create a roll-back point, in some embodiments the snapshot subsystem 165 creates a "snapset" that includes a snapshot of each storage volume in a storage group at a particular point in time.

Figure 2:
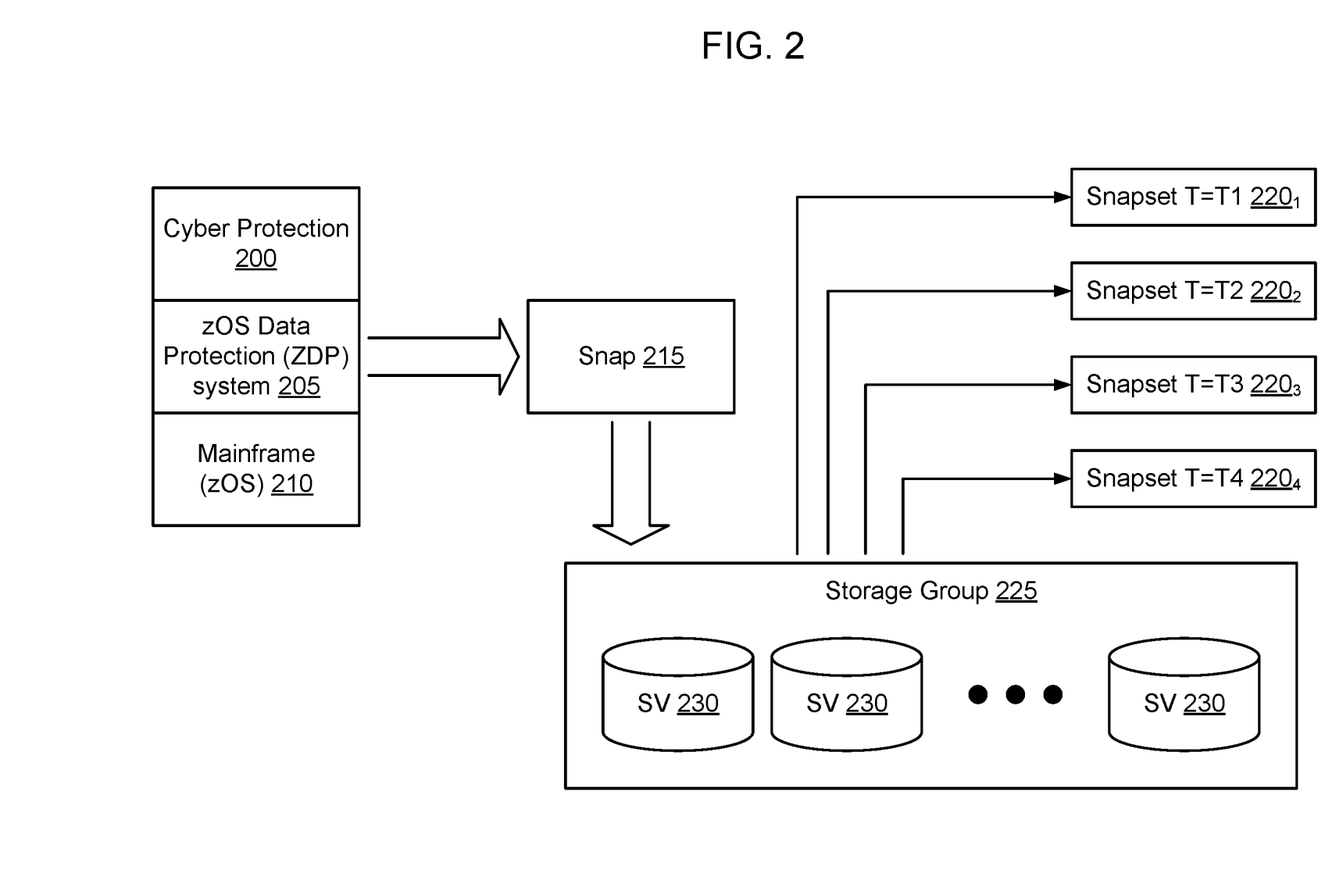
FIG. 2 is a functional block diagram of an example storage environment including a cyber protection subsystem configured to monitor for cyber intrusion events and a data protection system configured to create frequent consistent copies (snapsets) of storage volumes of a storage group, according to some embodiments.

FIG. 2 is a functional block diagram of an example storage environment including a cyber protection subsystem 200 configured to monitor for cyber intrusion events and a data protection system 205 configured to create frequent consistent copies (snapsets) of storage volumes of a storage group, according to some embodiments. As shown in FIG. 2, in some embodiments applications executing on a host such as mainframe (zOS) 210 are using data stored in storage volumes 230 that have been grouped together in a storage group 225. A data protection system 205, such as Dell Data Protector for z Systems (zDP), creates snapshots 215 of each of the storage volumes 230 in a storage group 225, to thereby create snapsets 220. For example, in FIG. 2 zDP has created snapset $220_1$ at time=T1, snapset $220_2$ at time=T2, snapset $220_3$ at time=$T_3$, and snapset $220_4$ at time=T4. The creation of frequent consistent copies of data provides space efficient copies that can be used for recovery, for example if data on one or more of the storage volumes 230 is corrupted in a cyber attack.

Figure 3:
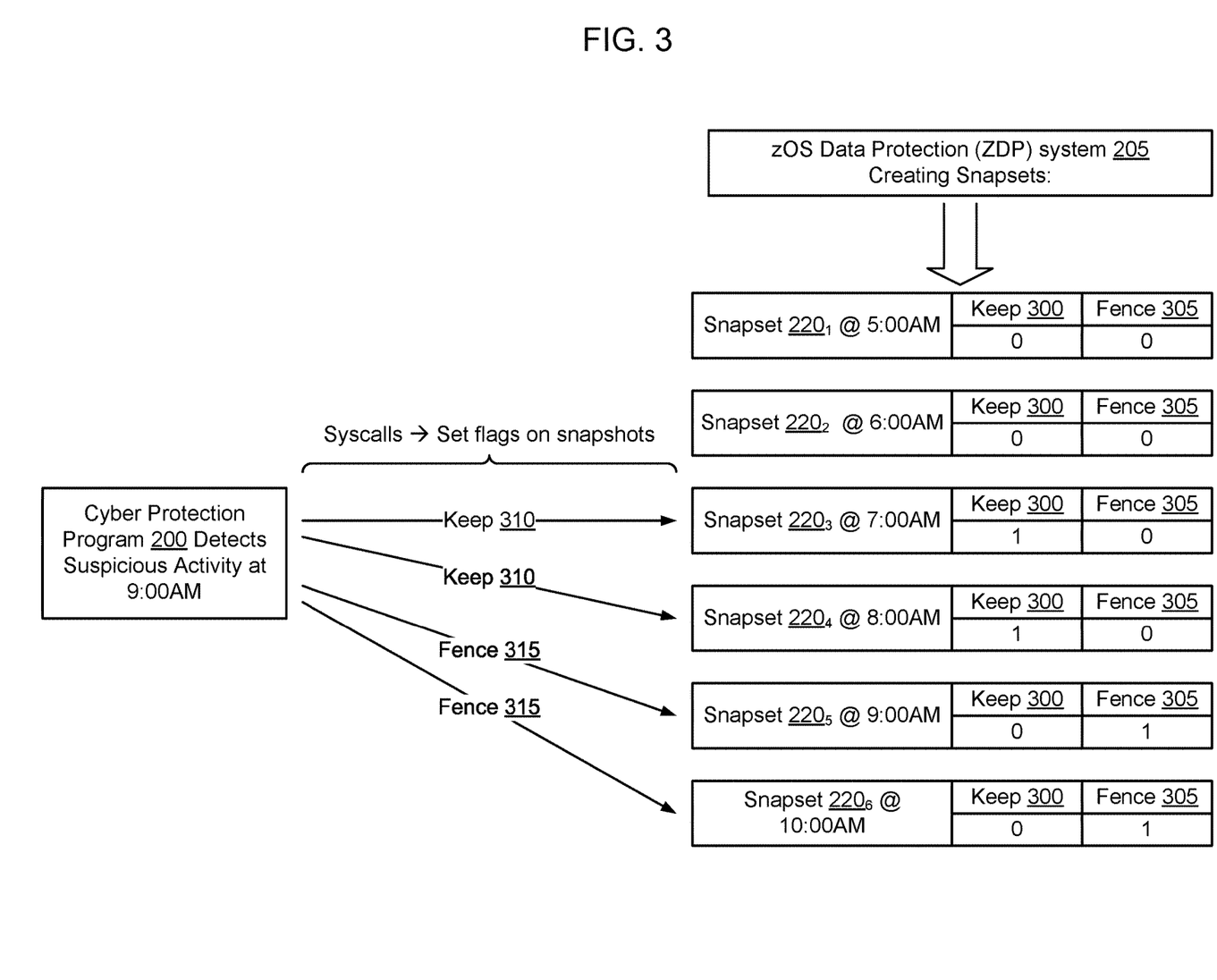
FIG. 3 is a functional block diagram of the example storage environment of FIG. 2, and showing example actions implemented by the cyber protection subsystem to restrict snapset utilization and ensure snapset preservation upon detection of a possible cyber intrusion event, according to some embodiments.

FIG. 3 is a functional block diagram of the example storage environment of FIG. 2, and showing example actions implemented by the cyber protection subsystem 200 to restrict snapset utilization and ensure snapset preservation upon detection of a possible cyber intrusion event, according to some embodiments. In some embodiments, as described in greater detail herein, two new syscalls are introduced to enable attributes of snapshots 215 or snapsets 220 to be set on the storage system 100. The syscalls are referred to herein as "keep" and "fence". Other terminology may be used as well, depending on the implementation. For convenience, the following description will focus on setting the keep and fence attributes of a particular snapshot. It should be understood that in some embodiments keep and fence attributes can be set simultaneously on a group or multiple groups of snapshots, such as on a snapset or group of snapsets, using a single syscall depending on the implementation.

A "keep" syscall is used to set a "keep" attribute of a snapshot to ensure preservation of the snapshot. When the keep attribute of a snapshot is set, the snapshot is not able to be terminated from the storage system until the "keep" attribute is reset. The keep attribute may be used to ensure snapshot preservation, to prevent the snapshot from being inadvertently, intentionally, or automatically terminated. For example, in some embodiments a snapshot with a keep attribute set cannot be terminated until the keep attribute has been reset.

A "fence" syscall is used to set a "fence" attribute of a snapshot, to restrict utilization of the snapshot. When a fence attribute of a snapshot is set, the snapshot is not able to be used until the data contained in the snapshot has been validated, either automatically or via a manual process. Once the data of the snapshot has been validated, the fence attribute can be reset to enable the snapshot to be used. The fence attribute of a snapshot may be used to restrict utilization of the snapshot, for example when a cyber intrusion event is detected that may potentially have corrupted the data of the snapshot.

As shown in FIG. 3, in some embodiments a snapshot subsystem 205 periodically creates snapsets 220 of a group of storage volumes 230. Each snapset 220 has a set of snapshots, and each snapshot has a keep attribute 300 and a fence attribute 305. For ease of illustration, the keep attribute 300 and fence attribute 305 are shown as being applied to the snapset, however it should be understood that in some embodiments each snapshot of the snapset has an independent keep attribute 300 and independent fence attribute 305.

In the example shown in FIG. 3, it is assumed that at 9:00 AM the cyber protection program 200 detects suspicious activity that may be associated with a cyber intrusion event. Accordingly, the cyber protection program 200 issues a first set of keep syscalls 310 to preserve one or more of the snapshots from a time preceding the possible cyber intrusion event, and issues a second set of fence syscalls 315 to restrict use of one or more of the snapshots that were created on or after the possible cyber intrusion event.

For example, in FIG. 3 the cyber protection program 200 issues a first set of keep syscalls 310 to set keep attributes on the snapshots of snapset $220_3$ that were created at 7:00 AM and to set the keep attributes 300 on the snapshots of snapset $220_4$ that were created at 8:00 AM. By setting the keep attributes 300 on these snapsets, it is possible to prevent the snapshots of the snapsets $220_3$ and $220_4$ from being deleted. Optionally, keep attributes could also be set on the earlier snapsets $220_1$, $220_2$, depending on the implementation. Snapsets 220 can be inadvertently deleted by a user, intentionally deleted by a user, or automatically deleted for example in connection with a snapset retention policy. By setting the keep attributes 300 on the snapsets that might be required for recovery from the cyber intrusion event, it is possible to ensure preservation of the snapsets 220.

Additionally, as shown in FIG. 3, the cyber protection program 200 issues a second set of fence syscalls 315 to set fence attributes 305 on the snapshots of snapset $220_5$ that were created at 9:00 AM and to set the fence attributes 305 on the snapshots of snapset $220_6$ that were created at 10:00 AM. By setting the fence attributes 305 on these snapsets $220_5$, $220_6$, it is possible to prevent the snapshots of these snapsets from being used until the data of the snapshots is able to be validated. This prevents snapshots that might have been corrupted from being used, to thereby facilitate recovery from the cyber intrusion event.

In some embodiments, it is possible for the storage system to set both the keep attribute 300 and the fence attribute 305 of the same snapshot. For example, it may be desirable to ensure preservation of a snapshot while at the same time restricting use of the snapshot until the data of the snapshot has been validated. Accordingly, in some embodiments, when a cyber intrusion event is determined, the cyber protection program may optionally issue syscalls to set both the keep attribute 300 and the fence attribute 305 for the snapshots of particular snapsets 220.

Figure 4:
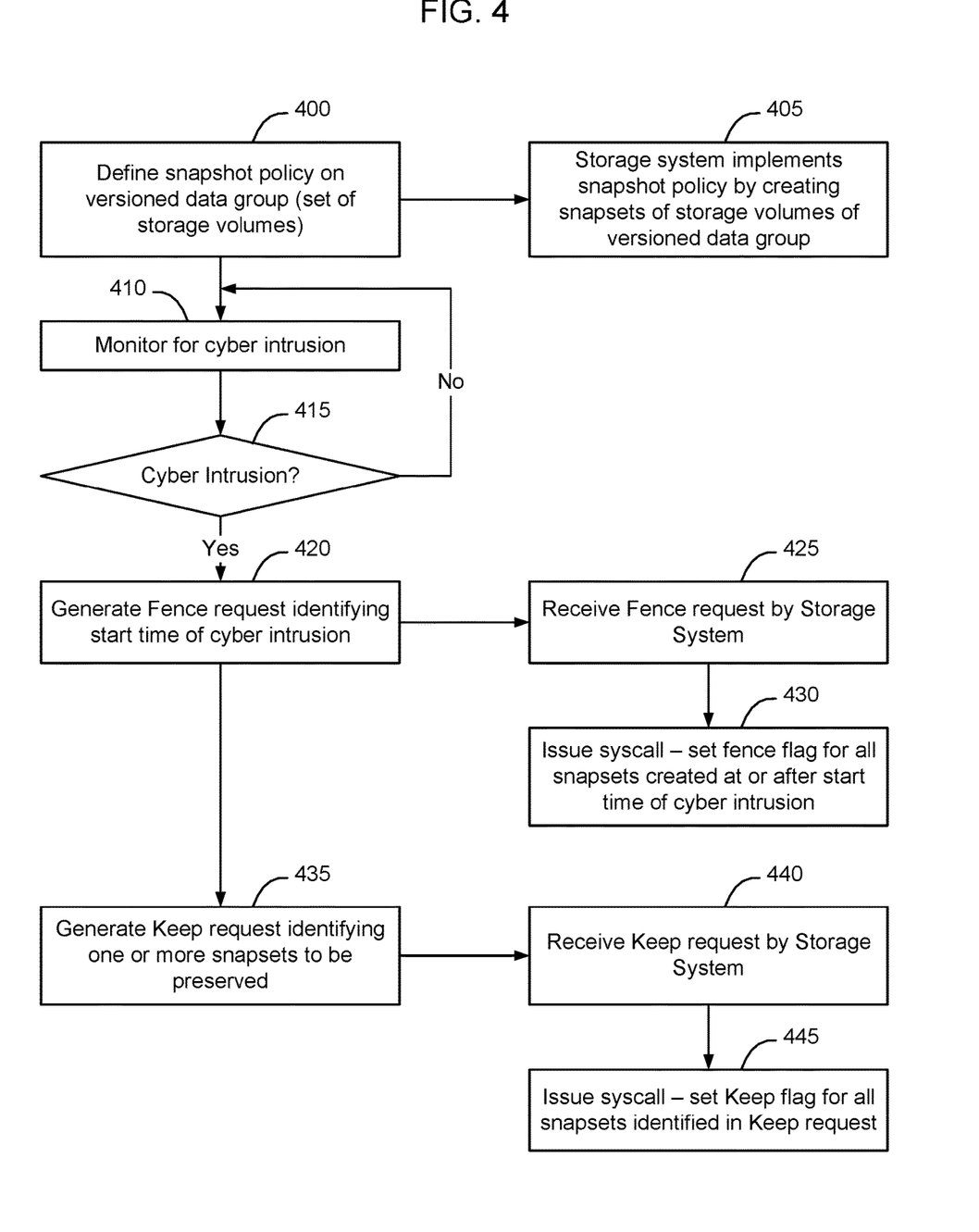
FIG. 4 is a flow chart of a process of restricting snapset utilization and ensuring snapset preservation, according to some embodiments.

FIG. 4 is a flow chart of a process of restricting snapset utilization and ensuring snapset preservation, according to some embodiments. As shown in FIG. 4, in some embodiments a snapshot policy is defined on a versioned data group (set of storage volumes 230) (block 400). The snapshot policy may specify, for example, the frequency with which snapsets should be created, the length of time the snapsets should be retained, and optionally a storage location such as a cloud repository where the snapsets should be stored. Recovery from logical data corruption on a wide scale, such as from a ransomware attack, is an essential element of a robust Cyber Resiliency strategy. The creation of frequent consistent copies of data, for example as offered by Dell Data Protector for z Systems (zDP), enables space efficient copies of storage volumes to be created that can be used for faster recovery than previous backup/recovery methods allowed. Accordingly, as shown in FIG. 4, once a snapshot policy has been defined, the snapshot policy is implemented by causing the storage system to create snapsets of the storage volumes of the versioned data group (block 405).

It is essential that both the availability and proper usage of such recovery copies be assured when they are needed most, which is at recovery time. If recovery copies containing corrupted data are used, recovery processes are elongated unnecessarily while 'good' copies of data are sought after to resolve the corruption. Further if good recovery copies are terminated in error, sub-optimal recovery points may be utilized in the data recovery process. Specifically, if recovery copies are suspected to contain corrupted data it is important that they be fenced off to prevent their being used until they have been validated, either automatically via software that detects corruption, or manually following validation processes. Similarly, validated snapshots should be protected from being terminated and losing a valuable recovery point in time copy.

As shown in FIG. 4, in some embodiments in addition to creating snapsets of the versioned data group, a cyber protection system 200 monitors the storage system 100 and/or host 102 for cyber intrusion (block 410). There are many ways to monitor for possible cyber intrusion events, which may include intrusion detection software as well as professional monitoring. The particular way that a system is monitored for cyber intrusion at block 410 will depend on the particular implementation.

A determination is then made if a cyber intrusion is possible (block 415). In instances where a possible cyber intrusion is not suspected (a determination of NO at block 415) the cyber protection system 200 monitors the storage system 100 and/or host 102 for cyber intrusion (block 410). In instances where a possible cyber intrusion is suspected (a determination of YES at block 415), the cyber protection system 200 generates a fence request to set the fence attribute of any snapshots that were generated on or after the time of the possible cyber intrusion (block 420). Optionally the fence request may identify the start time of the cyber intrusion (block 420). When the storage system 100 receives the fence request (block 425), it implements the fence request to set the fence attribute of any snapshots that were created on or after the start time of the cyber intrusion (block 430). Setting the fence attribute on the snapshots prevents any snapshots that might have been corrupted from being used to thereby facilitate recovery from the cyber intrusion event. Although FIG. 4 shows the storage array receiving the fence request from the cyber protection system 200 and then issuing one or more syscalls to implement the fence request, it should be understood that in some embodiments the cyber protection system 200 is able to directly issue the syscalls to set the fence attributes of the affected snapshots.

Additionally, as shown in FIG. 4, in instances where a possible cyber intrusion is suspected (a determination of YES at block 415), the cyber protection system 200 also generates a keep request to set the keep attribute of a subset of the snapshots or all of the snapshots of the versioned data group that were generated before the time of the possible cyber intrusion (block 435). Optionally the keep request may identify the start time of the cyber intrusion (block 435). When the storage system 100 receives the keep request (block 440), it implements the keep request to set the keep attribute of any snapshots that were created before the start time of the cyber intrusion (block 445). Setting the keep attribute on the snapshots prevents any snapshots that might be required to recover from the cyber intrusion event from being terminated. Although FIG. 4 shows the storage array receiving the keep request from the cyber protection system 200 and then issuing one or more syscalls to implement the keep request, it should be understood that in some embodiments the cyber protection system 200 is able to directly issue the syscalls to set the keep attributes of the affected snapshots.

Although FIG. 4 shows blocks 420 and 435 being implemented sequentially, it should be understood that blocks 420 and 435 can be implemented in the reverse order or simultaneously, depending on the implementation. Additionally, in some embodiments upon detection of a possible cyber intrusion, a single syscall is used to specify the time of the possible cyber intrusion, and the storage system is configured to respond to the cyber intrusion syscall to automatically set the keep flags on snapshots that were created before the time of the possible cyber intrusion event, and to automatically set the fence flags on all snapshots that were created on or after the possible cyber intrusion event.

Figure 5:
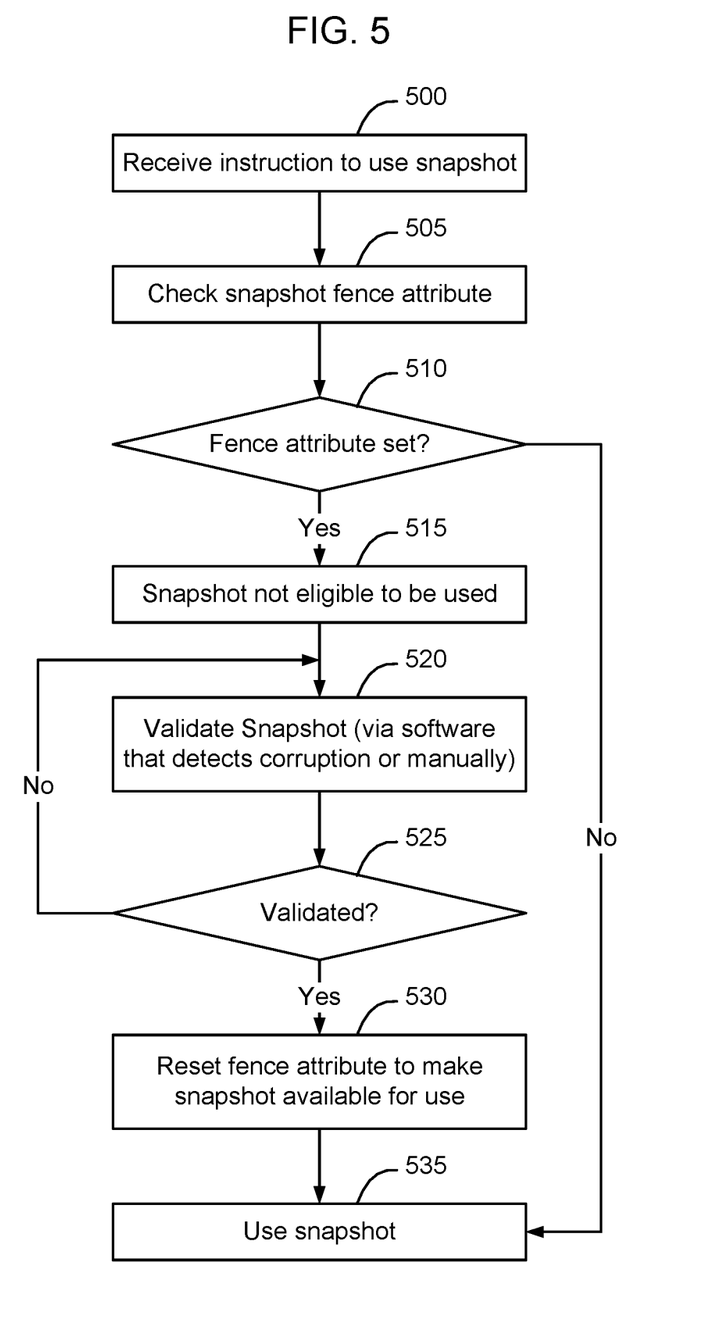
FIG. 5 is a flow chart of a process of restricting snapset utilization in greater detail, according to some embodiments

FIG. 5 is a flow chart of a process of restricting snapset utilization in greater detail, according to some embodiments. As shown in FIG. 5, in some embodiments when instructions are received to use a snapshot (block 500) the storage system 100 checks the snapshot to determine if the fence attribute 305 of the snapshot has been set (block 505). An example attribute may be implemented as a flag or a bit, depending on the implementation. If the fence attribute 305 is not set (a determination of NO at block 510), use of the snapshot is not restricted, and the snapshot is able to be used (block 535).

If the fence attribute 305 is set (a determination of YES at block 510), use of the snapshot is restricted and the snapshot is not able to be used (block 515) until the data of the snapshot is validated. Accordingly, prior to using the snapshot, the snapshot data is attempted to be validated (block 520). Data validation may be implemented using software that is configured to detect corruption or manually, depending on the implementation. A determination is then made if the data of the snapshot has been validated (block 525). While the data remains not validated (a determination of NO at block 525) the fence attribute remains set on the snapshot and the snapshot is not able to be used. Once the data of the snapshot has been validated (a determination of YES at block 525), the fence attribute of the snapshot is reset to make the snapshot available for use (block 530). The snapshot is then able to be used (block 535).

Figure 6:
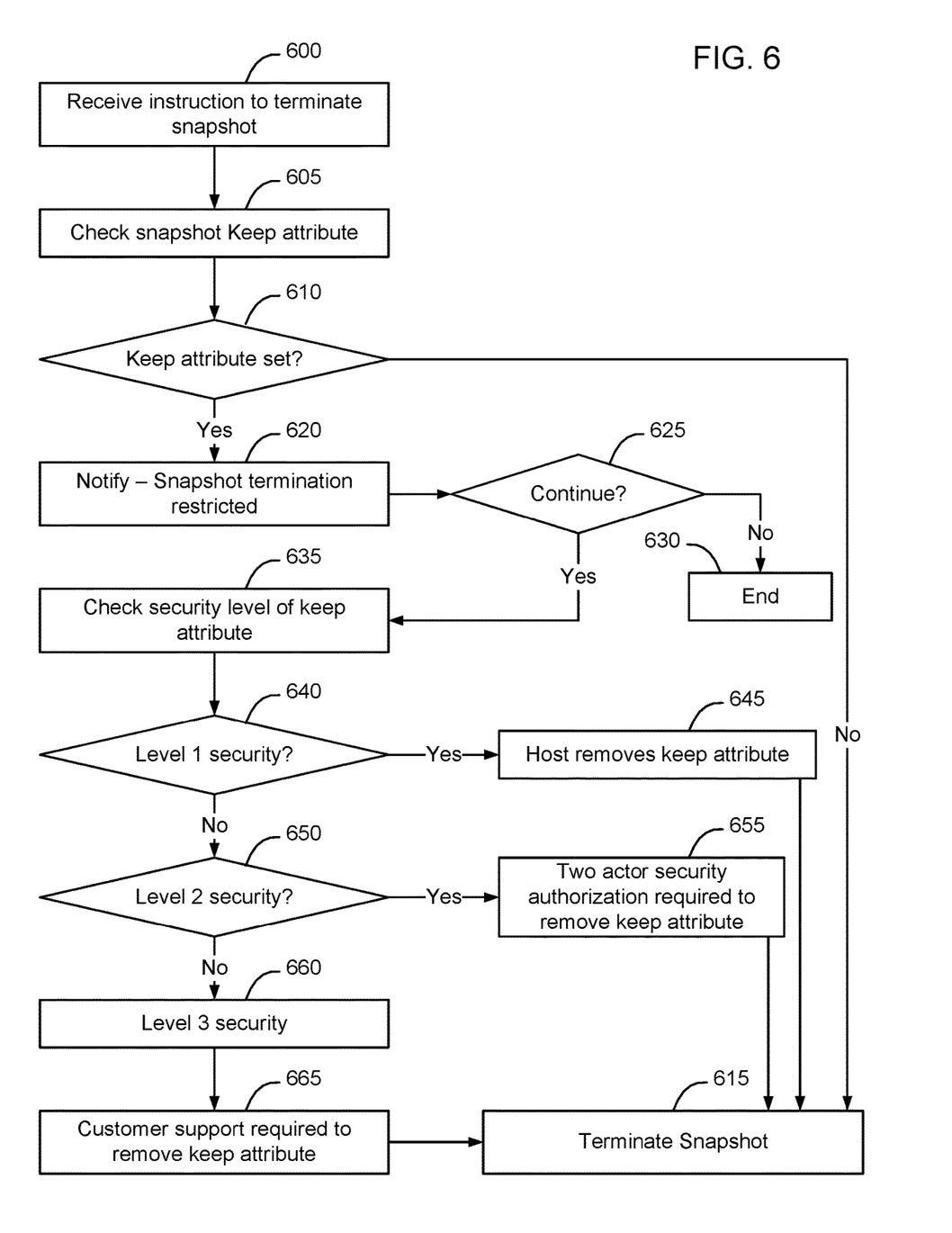
FIG. 6 is a flow chart of a process of ensuring snapset preservation in greater detail, according to some embodiments

FIG. 6 is a flow chart of a process of ensuring snapset preservation in greater detail, according to some embodiments. As shown in FIG. 6, when an instruction is received to terminate a snapshot (block 600) the storage system 100 checks the snapshot to determine if the keep attribute 300 of the snapshot has been set (block 605). An example keep attribute 300 may be implemented as a flag or a bit, depending on the implementation. If the keep attribute is not set (a determination of NO at block 610), termination of the snapshot is not restricted, and the snapshot is able to be terminated (block 615).

If the keep attribute is set (a determination of YES at block 610), termination of the snapshot is restricted. In some embodiments, when termination of a snapshot is restricted, if the termination attempt was being manually implemented by a user, for example via a user interface of a storage system management system 160, a notice is provided to the user via the user interface to notify the user that termination of the snapshot is restricted (block 620). In some embodiments, a determination is then made as to whether the user would like to continue the termination process (block 625). In instances where termination of the snapshot should not continue (a determination of NO at block 625) the snapshot termination process ends (block 630).

In instances where termination of the snapshot should continue (a determination of YES at block 625), in some embodiments the storage system determines a security level of the keep attribute (block 635). In some embodiments, in addition to using a keep flag to identify particular snapshots that should not be terminated, the snapshots also include a security attribute identifying a security level required to modify the keep flag. Particular snapshots might be used to protect particularly sensitive data and, as such, in some embodiments different security levels are used to specify different levels of authorization required to modify the keep attribute to enable the snapshot to be terminated.

FIG. 6 illustrates an example process in which there are three security levels, although it should be understood that other numbers of security levels might be used or different types of security levels might be used, depending on the implementation. In the example shown in FIG. 6, a determination is made as to whether the security level associated with the keep attribute is set to level 1 (block 640). In instances where the security level associated with the keep attribute is set to level 1 (a determination of YES at block 640) the user is allowed to reset the keep attribute (block 645). After the keep attribute of the snapshot has been reset, the snapshot is terminated (block 615).

In instances where the security level associated with the keep attribute is not set to level 1 (a determination of NO at block 640), in some embodiments a determination is made as to whether the security level associated with the keep attribute is set to level 2 (block 650). In instances where the security level associated with the keep attribute is set to level 2 (a determination of YES at block 650), in some embodiments two actor security authorization is required to reset the keep attribute (block 655). After the keep attribute of the snapshot has been reset using the two actor security authorization process, the snapshot is terminated (block 615).

In instances where the security level associated with the keep attribute is not set to level 1 or 2 (a determination of NO at block 640 and a determination of NO at block 650), in some embodiments the security level associated with the keep attribute is set to level 3 (block 660). In instances where the security level associated with the keep attribute is set to level 3, in some embodiments the customer service center that provides technical support for the storage system is required to reset the keep attribute (block 665). After the keep attribute of the snapshot has been reset by customer support, the snapshot is terminated (block 615).

Figure 7:
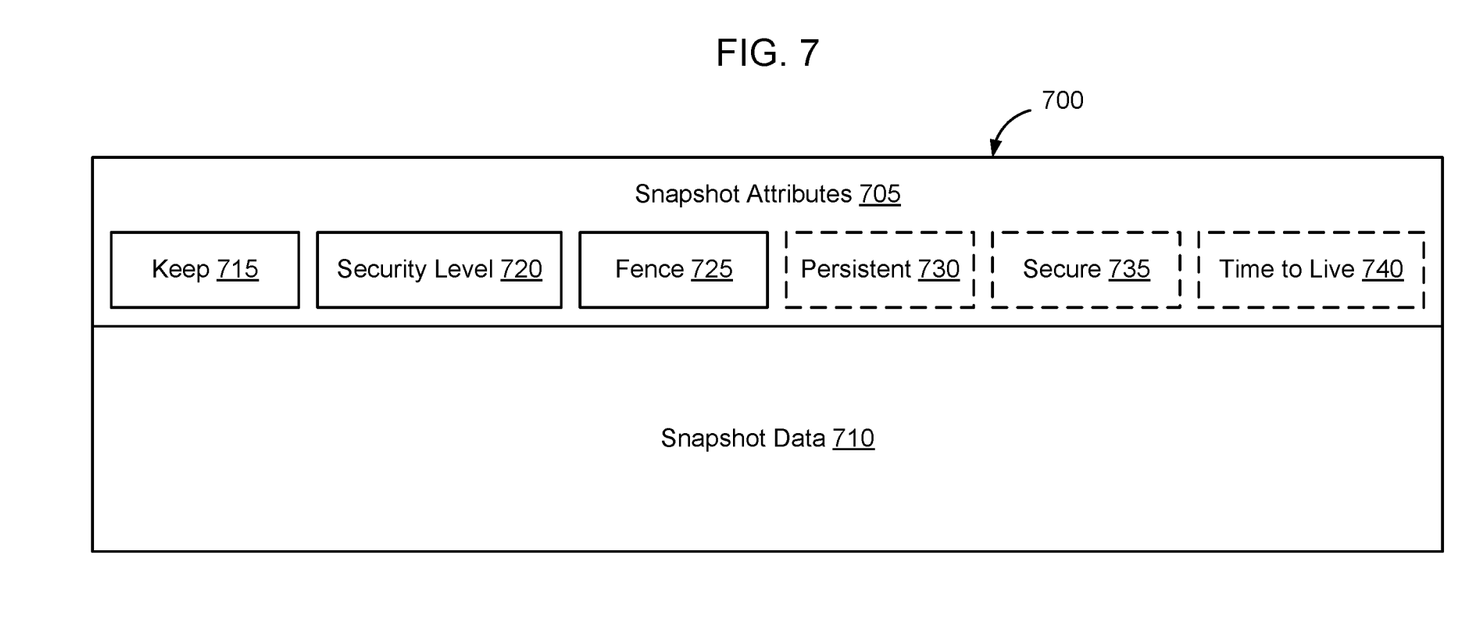
FIG. 7 is a functional block diagram of an example snapshot including attributes to restrict snapset utilization and ensure snapset preservation, according to some embodiments.

FIG. 7 is a functional block diagram of an example snapshot including attributes to restrict snapset utilization and ensure snapset preservation, according to some embodiments. As shown in FIG. 7, in some embodiments the snapshot 700 includes a set of snapshot attributes 705 and snapshot data 710. The snapshot data 710 contains the data of the storage volume 230 on which the snapshot was created. The snapshot attributes 705 include the keep attribute 715 described herein, that is used to ensure snapshot preservation. The keep attribute 715 is also accompanied, in some embodiments, with a security level attribute 720 that specifies a level of authorization required to modify (reset) the keep attribute 715. In some embodiments, the snapshot attributes 705 further include the fence attribute 725 described herein, that is used to restrict snapshot utilization.

Some storage systems have conventionally enabled other types of attributes to be set on particular snapshots. For example, some storage systems enabled a "persistent" attribute 730 to be set, to specify that the snapshot should not be automatically terminated by the storage system upon the creation of a new snapset. Some storage systems also enabled a "secure" attribute 735 to be set on a snapshot, which could be used to prevent termination of a snapshot until expiration of a particular specified time. Use of the "secure" attribute is not easy to reverse, and requires intervention from customer support. Further, the "secure" attribute automatically caused the secure attribute to be reset upon expiration of the particular specified period of time, and thus was not guaranteed to prevent a required snapshot from being inadvertently terminated. Some storage systems also used a time to live attribute 740, which specified a period of time to keep the snapshot on the storage system. Once again, upon expiration of the time to live period, the snapshot is able to be terminated or may be automatically terminated, thus failing to ensure snapshot preservation.

By enabling a keep attribute to be applied to a snapshot, and enabling a fence attribute to be applied to a snapshot, it is possible to ensure preservation of known good snapshots, while preventing use of possibly corrupt snapshots, to facilitate recovery from cyber intrusion events.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of ensuring snapshot preservation and restricting snapshot utilization, comprising:
   creating periodic snapsets of a set of storage volumes, each snapset including a respective snapshot of each storage volume of the set of storage volumes, each snapshot being a point in time copy of data contained in the storage volume as the data existed at a particular point in time;
   determining occurrence of a possible cyber intrusion event at a cyber intrusion event time;
   in response to determining occurrence of the possible cyber intrusion event related to one of the storage volumes of the set of storage volumes, issuing one or more system calls to an operating system, each of the one or more system calls containing the cyber intrusion event time and being configured to cause the operating system to implement operations including both:
      setting a respective fence attribute, by the operating system, of each respective snapshot of each snapset of the set of storage volumes that was created at the identified cyber intrusion event time or after the identified cyber intrusion event time, the fence attribute being a first of several attributes included in the snapshot and restricting utilization of the snapshot for cyber recovery from the possible cyber intrusion event until after the data contained in the snapshot has been validated; and
      setting a respective keep attribute, by the operating system, of each respective snapshot of a subset of the snapsets of the set of storage volumes that were created before the identified cyber intrusion event time, the respective keep attribute being a second of the several attributes included in the snapshot and preventing automatic termination of the respective snapshot and preventing manual termination of the respective snapshot until the respective keep attribute has been reset.

2. The method of claim 1, further comprising:
   initiating a cyber recovery process in response to occurrence of the possible cyber intrusion event;
   initiating a request to use a first of the snapshots that was created after the cyber intrusion event time for the cyber recovery process in response to occurrence of the possible cyber intrusion event;
   checking the fence attribute of the first of the snapshots;
   determining that the fence attribute of the first of the snapshots has been set; and
   in response to determining that the fence attribute of the first of the snapshots has been set, preventing use of the first of the snapshots for cyber recovery from the possible cyber intrusion event.

3. The method of claim 1, further comprising:
   receiving a request to terminate a first snapshot of the subset of the snapshots that was created before the cyber intrusion event time;
   checking the keep attribute of the first of the snapshots;
   determining that the keep attribute of the first of the snapshots has been set; and
   generating a notification that the first snapshot is not able to be terminated due to the presence of the keep attribute.

4. The method of claim 3, further comprising:
   receiving a request to reset the keep attribute;
   checking an authorization level associated with the request to reset the keep attribute;
   comparing the authorization level associated with the request to reset the keep attribute with a security level associated with the keep attribute; and
   resetting the keep attribute only where the authorization level associated with the request to reset the keep attribute is higher than or equal to the authorization level specified by the security level.

5. The method of claim 1, further comprising setting a respective security level associated with each respective keep attribute, the security level being selected from a plurality of security levels, each security level specifying a different type of authorization required to reset the respective keep attribute to enable the respective snapshot to be terminated.

6. The method of claim 5, wherein a first of the plurality of security levels specifies that a host can reset the keep attribute of the respective snapshot after being notified that the keep attribute has been applied to a particular snapshot.

7. The method of claim 6, wherein a second of the plurality of security levels specifies that two actor authorization is required to reset the keep attribute of the respective snapshot after being notified that the keep attribute has been applied to a particular snapshot.

8. The method of claim 7, wherein a third of the plurality of security levels specifies that customer service is required to reset the keep attribute of the respective snapshot.

9. The method of claim 1, wherein the fence attributes and keep attributes are implemented by the operating system as flags on the snapshots.

10. The method of claim 1, wherein setting the keep attribute on the respective snapshot prevents the respective snapshot from being terminated automatically after expiration of a time to live attribute of the respective snapshot.

11. A system for ensuring snapshot preservation and restricting snapshot utilization, comprising:
   one or more computers and one or more storage devices storing instructions that are operable, when executed by the one or more computers, to cause the one or more computers to perform operations comprising:
      creating periodic snapsets of a set of storage volumes, each snapset including a respective snapshot of each storage volume of the set of storage volumes, each snapshot being a point in time copy of the data contained in the storage volume as the data existed at a particular point in time;
      determining occurrence of a possible cyber intrusion event at a cyber intrusion event time;

in response to determining occurrence of the possible cyber intrusion event related to one of the storage volumes of the set of storage volumes, issuing one or more system calls to an operating system, each of the one or more system calls containing the cyber intrusion event time and being configured to cause the operating system to implement operations including both:

setting a respective fence attribute, by the operating system, of each respective snapshot of each snapset of the set of storage volumes that was created at the identified cyber intrusion event time or after identified the cyber intrusion event time, the fence attribute being a first of several attributes included in the snapshot and restricting utilization of the snapshot for cyber recovery from the possible cyber intrusion event until after the data contained in the snapshot has been validated; and setting a respective keep attribute, by the operating system, on of each respective snapshot of a subset of the snapsets of the set of storage volumes that were created before the identified cyber intrusion event time, the respective keep attribute being a second of the several attributes included in the snapshot and preventing automatic termination of the respective snapshot and preventing manual termination of the respective snapshot until the respective keep attribute has been reset.

12. The system of claim 11, wherein the instructions are further operable, when executed by the one or more computers, to cause the one or more computers to perform operations comprising:

initiating a cyber recovery process in response to occurrence of the possible cyber intrusion event;

initiating a request to use a first of the snapshots that was created after the cyber intrusion event time for the cyber recovery process in response to occurrence of the possible cyber intrusion event;

checking the fence attribute of the first of the snapshots;

determining that the fence attribute of the first of the snapshots has been set; and in response to determining that the fence attribute of the first of the snapshots has been set, preventing use of the first of the snapshots for cyber recovery from the possible cyber intrusion event.

13. The system of claim 11, wherein the instructions are further operable, when executed by the one or more computers, to cause the one or more computers to perform operations comprising:

receiving a request to terminate a first snapshot of the subset of the snapshots that was created before the cyber intrusion event time;

checking the keep attribute of the first of the snapshots;

determining that the keep attribute of the first of the snapshots has been set; and generating a notification that the first snapshot is not able to be terminated due to the presence of the keep attribute.

14. The system of claim 13, wherein the instructions are further operable, when executed by the one or more computers, to cause the one or more computers to perform operations comprising:

receiving a request to reset the keep attribute;

checking an authorization level associated with the request to reset the keep attribute;

comparing the authorization level associated with the request to reset the keep attribute with a security level associated with the keep attribute; and resetting the keep attribute only where the authorization level associated with the request to reset the keep attribute is higher than or equal to the authorization level specified by the security level.

15. The system of claim 11, wherein the instructions are further operable, when executed by the one or more computers, to cause the one or more computers to perform operations comprising:

setting a respective security level associated with each respective keep attribute, the security level being selected from a plurality of security levels, each security level specifying a different type of authorization required to reset the respective keep attribute to enable the respective snapshot to be terminated.

16. The system of claim 15, wherein a first of the plurality of security levels specifies that a host can reset the keep attribute of the respective snapshot after being notified that the keep attribute has been applied to a particular snapshot.

17. The system of claim 16, wherein a second of the plurality of security levels specifies that two actor authorization is required to reset the keep attribute of the respective snapshot after being notified that the keep attribute has been applied to a particular snapshot.

18. The system of claim 17, wherein a third of the plurality of security levels specifies that customer service is required to reset the keep attribute of the respective snapshot.

19. The system of claim 11, wherein the fence attributes and keep attributes are implemented by the operating system as flags on the snapshots.

20. The system of claim 11, wherein setting the keep attribute on the respective snapshot prevents the respective snapshot from being terminated automatically after expiration of a time to live attribute of the respective snapshot.

* * * * *